(12) United States Patent
Borchers et al.

(10) Patent No.: US 10,072,882 B2
(45) Date of Patent: Sep. 11, 2018

(54) SOLAR POWERED THERMALLY CONDITIONED SPACE

(71) Applicant: SOLERCOOL LTD, Terrace Park, OH (US)

(72) Inventors: John Borchers, Terrace Park, OH (US); Mohsen Rezayat, Terrace Park, OH (US); Phil Baker, Waynesville, OH (US)

(73) Assignee: SOLERCOOL LTD, Terrace Park, OH (US)

( * ) Notice: Subject to any disclaimer, the term of this patent is extended or adjusted under 35 U.S.C. 154(b) by 122 days.

(21) Appl. No.: 14/439,331

(22) PCT Filed: Oct. 29, 2013

(86) PCT No.: PCT/US2013/067291
§ 371 (c)(1),
(2) Date: Apr. 29, 2015

(87) PCT Pub. No.: WO2014/070755
PCT Pub. Date: May 8, 2014

(65) Prior Publication Data
US 2015/0285541 A1    Oct. 8, 2015

(30) Foreign Application Priority Data

Oct. 29, 2012  (IN) .......................... 3121/MUM/2012
Oct. 28, 2013  (IN) .......................... 3121/MUM/2012

(51) Int. Cl.
*H02S 20/32*    (2014.01)
*F25B 27/00*    (2006.01)
*F25D 13/00*    (2006.01)

(52) U.S. Cl.
CPC ............ *F25B 27/005* (2013.01); *F25D 13/00* (2013.01); *F25D 2323/0024* (2013.01); *Y02B 10/20* (2013.01); *Y02B 10/24* (2013.01)

(58) Field of Classification Search
CPC ..... Y02E 10/566; F25D 3/00; F25D 2400/12; F25D 11/00; Y02B 10/24; Y02B 10/20; F25B 27/005; F25B 27/002; H02S 20/32
See application file for complete search history.

(56) References Cited

U.S. PATENT DOCUMENTS 4,019,339 A  *  4/1977  Anderson ............. A47F 3/0443
                                                      62/255
4,367,633 A  *  1/1983  Strathman ............. F25B 27/002
                                                      62/236
(Continued)

FOREIGN PATENT DOCUMENTS

CN         102620368 A  *  8/2012
JP         H 06-137733 A    5/1994
(Continued)

OTHER PUBLICATIONS

"Machine Translation of CN 102620238A, Haoyang, Jun. 2012".*
International Search Report and Written Opinion dated Jan. 21, 2014 for Application No. PCT/US2013/067291.

*Primary Examiner* — Frantz Jules
*Assistant Examiner* — Martha Tadesse
(74) *Attorney, Agent, or Firm* — Frost Brown Todd LLC

(57) ABSTRACT

The present disclosure discloses a solar powered thermally conditioned space, which, in an embodiment, may be used to provide a cold storage arrangement for preservation of perishable commodities over an extended time period. The cold storage arrangement (10) includes a refrigeration unit mounted within a non-insulated compartment for circulating refrigerated de-humidified air to an insulated compartment. A chamber (12) defines the insulated compartment and the
(Continued)

non-insulated compartment. The cold storage arrangement (10) is operated by a powering system powered by solar energy from solar panels mounted over a roof of the chamber (12).

19 Claims, 5 Drawing Sheets

(56) References Cited

U.S. PATENT DOCUMENTS

| | | | |
|---|---|---|---|
| 5,598,713 A * | 2/1997 | Bartilucci | F25D 3/105 62/384 |
| 5,809,789 A * | 9/1998 | Baker | F25B 47/022 62/156 |
| 6,508,074 B1 * | 1/2003 | Cava | B60H 1/3227 62/244 |
| 9,257,938 B2 * | 2/2016 | Bourne | H02S 40/10 |
| 2004/0055313 A1 * | 3/2004 | Navedo | F25B 9/14 62/6 |
| 2004/0226309 A1 * | 11/2004 | Broussard | F25D 11/003 62/236 |
| 2005/0081558 A1 * | 4/2005 | Yoshida | F25D 11/003 62/457.9 |
| 2009/0058352 A1 | 3/2009 | Lin | |

FOREIGN PATENT DOCUMENTS

| | | | | |
|---|---|---|---|---|
| JP | 2010-236806 A | 10/2010 | | |
| KR | 10-0743607 B1 | 7/2007 | | |
| WO | WO 2011094099 A1 * | 8/2011 | ......... | B60H 1/00428 |
| WO | WO 2014/070755 | 5/2014 | | |

* cited by examiner

SOLAR POWERED THERMALLY CONDITIONED SPACE

RELATED APPLICATIONS

This application is the U.S. National Phase of International Application No. PCT/US2013/067291, which was filed on Oct. 29, 2013, which claims priority to Indian Patent Application No. 3121/MUM/2012, which was filed on Oct. 29, 2012, which applications are hereby incorporated by reference, in their entireties.

FIELD OF THE DISCLOSURE

The present disclosure relates generally to the field of thermally conditioned space and more particularly to the use of solar power to provide cooled space. The innovation is disclosed in connection with, but not necessarily limited to, space for cold storage of perishable commodities powered by solar power.

BACKGROUND

Often it is desirable to maintain items at a desired temperature or within a desired temperature range. When the ambient temperatures are different than the desired temperature or temperature range, whether the ambient temperature is variably or constantly different, such items are typically placed in a thermally conditioned space. Depending upon the difference between the desired temperature or temperature range and the ambient temperature, the thermally conditioned space may either have heat removed or added to it. The present innovation provides for removing heat to create a thermally conditioned space which is cool or cold.

The need for such cool or cold space may arise in areas within which there is not a reliable source of electrical power to run the equipment or components necessary or required to cool the space. For example, there are many areas in the world which do not have any access to the power grid. There are others which have access, but the power grid is unreliable with power being unavailable during periods of time. The present innovation provides the use of solar power to the energy necessary to provide such cool or cold space.

While many different items may beneficially be kept within cool or cold spaces, one use of thermally conditioned spaces is to maintain perishable commodities, such as, milk, meat, eggs, vegetables, fruits, ornamental flowers and other floricultural products, which tend to perish when stored in natural environmental condition. When the prevailing natural environmental condition has high temperature, it is favorable for growth of micro-organisms. Hence, perishable commodities are required to be stored at a low temperature in order to retard the growth of micro-organisms and thus increasing their shelf life. This is because low temperature retards the activity and growth of micro-organisms and thus enables preserving perishable commodities in their natural state for a certain period of time. The degree to which the temperature is required to be lowered is dependent on storage time and the type of commodity to be stored.

In order to cater to the problem of storing perishable commodities, a storage space maintained at a low temperature is used for storing the perishable commodities. Conventionally, a storage room is formed within a thermally insulated housing having a cold air discharge port and a warm air return port provided at the base of the thermally insulated housing. The thermally insulated housing communicates with a machine room located under the thermally insulated housing through the cold air discharge port and the warm air return port. A cooling unit, having a cooler, a blower and a compressor is mounted in the machine room and helps in maintaining the temperature of the storage space at a desired low temperature. However, conventional arrangement of the storage room involves increased maintenance due to leakage of cold air between the thermally insulated housing and the machine room through openings provided for the cold air discharge port and the warm air return port. Further, the conventional storage room involves complicated mounting operations. The conventional storage room involves extensive usage of electrical energy and hence in areas where there is shortage of electrical energy, the working of the conventional storage room is required to be stalled until the supply of electrical energy is restored or is not a viable option. This results in commodities stored within the conventional storage room to perish or the cold storage facility to be unavailable or unsuitable for storing the perishable commodities.

Hence, there is felt a need for a cool or cold thermally conditioned space which overcomes the drawbacks and deficiencies of conventional spaces.

OBJECTS

Some of the objects of the system of the present disclosure, which at least one embodiment herein satisfies, are as follows:

An object of the present disclosure is to provide a cold space arrangement which is easy to install at a wide variety of locations.

Another object of the present disclosure is to provide a cold arrangement which is easy to maintain.

Still another object of the present disclosure is to provide a cold space arrangement which enables storage of commodities over an extended time period.

An added object of the present disclosure is to provide a cost effective cold space arrangement.

An additional object of the present disclosure is to provide an efficient and reliable cold space arrangement.

An added object of the present disclosure is to provide an affordable and sustainable cold space arrangement.

Another object of the present disclosure is to provide a cold space arrangement extending adequate protection to the commodities stored therein.

Still another object of the present disclosure is to provide an ecofriendly cold space arrangement utilizing renewable green energy.

Yet another object of the present disclosure is to provide a cold space arrangement operable in locations having non-existent/unreliable/expensive electrical infrastructure.

Still a further object of the present disclosure is to provide a cold space arrangement utilizing solar power as its primary source of energy.

Other objects and advantages of the present disclosure will be more apparent from the following description when read in conjunction with the accompanying figures, which are not intended to limit the scope of the present disclosure.

SUMMARY

In accordance with the present disclosure there is provided a cold space arrangement which may, for example be used for the preservation of perishable commodities over an extended time period, the arrangement comprising:

a chamber covered by a ceiling;

an insulated partitioning wall adapted to partition the chamber into an insulated compartment and a non-insulated compartment, a pair of opposing vents defined on the non-insulated for inlet and outlet of atmospheric air;

a refrigeration unit mounted on the insulated partitioning wall, the refrigeration unit adapted to coolingly circulate refrigerated de-humidified air to the insulated compartment via a duct, the insulated compartment adapted to be maintained at a desired temperature;

an air filtration unit adapted to filter the atmospheric air entering through one of the vents to form filtered atmospheric air, the filtered atmospheric air adapted to withdraw heat from the refrigeration unit and is expelled to the environment; and a powering system housed within the non-insulated compartment, the powering system adapted to receive power from at least an array of solar panels supported on the ceiling, the powering system adapted to controllably charge a battery bank, having at least one battery, via an inverter.

The insulated compartment may include an insulated door with a product discharge door for movement of the commodities into and out of the insulated compartment.

The non-insulated compartment may include an access door for repair and maintenance.

The refrigeration unit includes a condenser, a compressor and an evaporator enclosed with a cabinet. The cabinet may be made of a high density polymer shell.

Additionally, the battery bank may be charged by a mains AC supply through a convertor.

Optionally, the battery bank may be intermittently charged by a mains AC supply through a convertor.

Typically, the convertor is selected from the group consisting of a rectifier, an AC/DC converter, a transformer and switched-mode power supply.

Additionally, a battery health indicator may be adapted to indicate a level of charge in each of the batteries and an overall charge of the battery bank.

BRIEF DESCRIPTION OF ACCOMPANYING DRAWINGS

The cold space arrangement of the present disclosure will now be described with the help of the accompanying drawings, in which.

DETAILED DESCRIPTION OF THE ACCOMPANYING DRAWINGS

Figure 1:
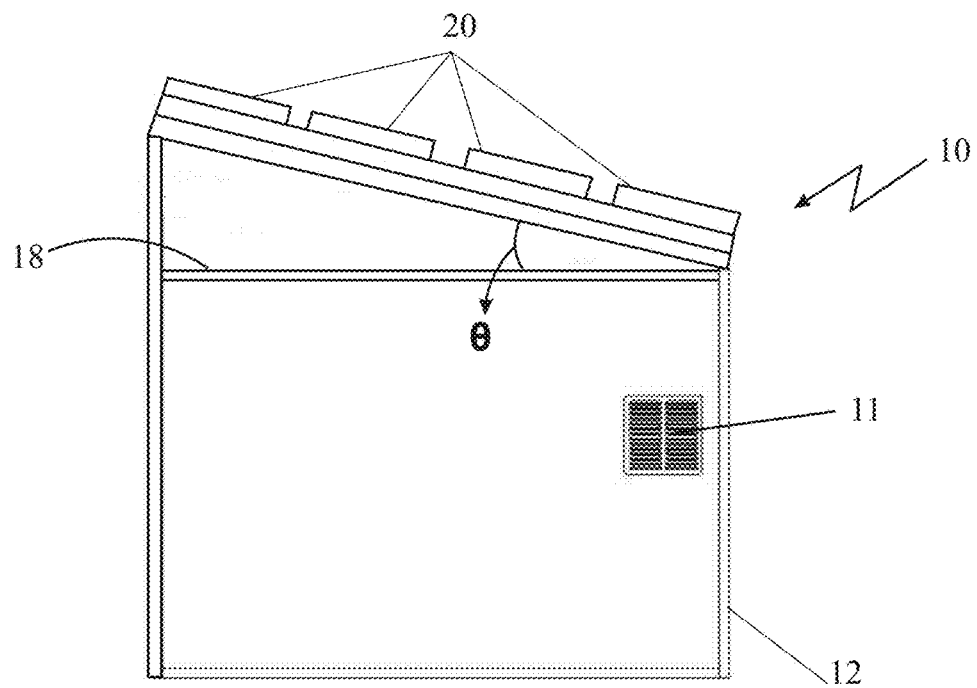
FIG. 1 illustrates the side view of the cold space arrangement in accordance with the present disclosure.
Figure 2:
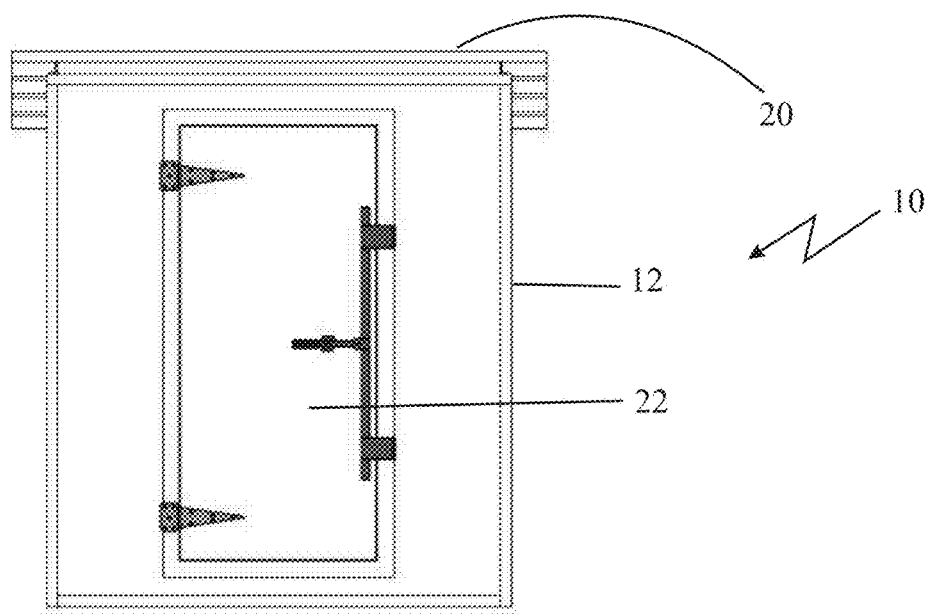
FIG. 2 illustrates the front view of the cold space arrangement in accordance with the present disclosure.
Figure 3A:
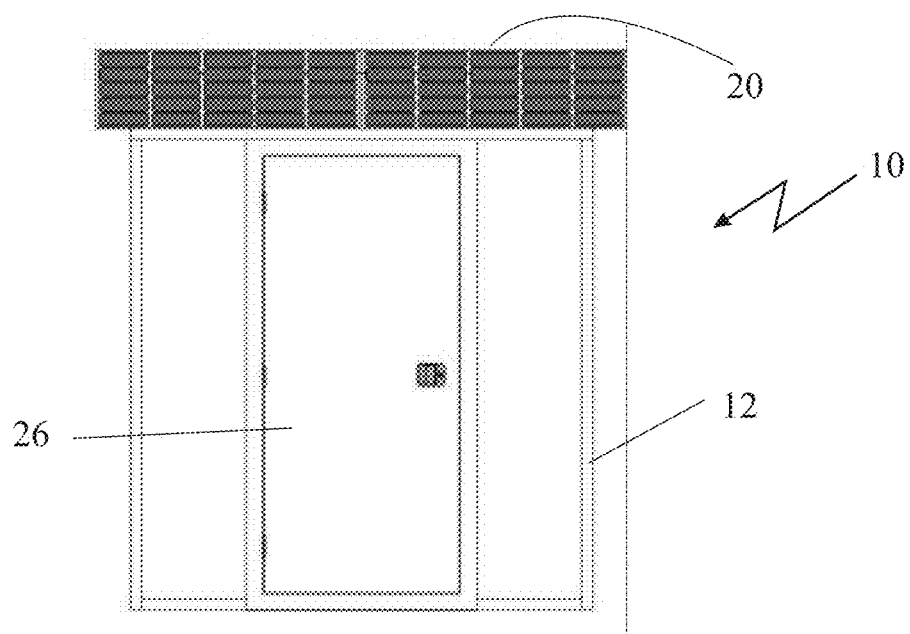
FIG. 3a illustrates the rear view of the cold space arrangement in accordance with the present disclosure.
Figure 3B:
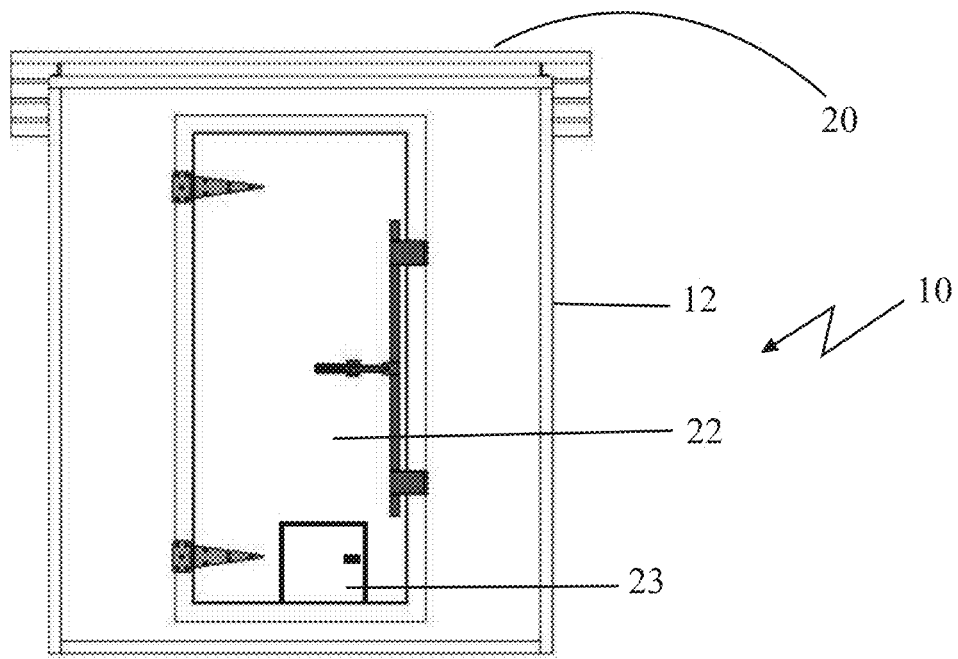
FIG. 3b illustrates product discharge door defined on the insulated door of the cold space arrangement in accordance with the present disclosure.

A preferred embodiment of the cold space arrangement of the present disclosure will now be described in detail with reference to the accompanying drawings. The described embodiment does not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring to the accompanied drawings, the cold space arrangement, in accordance with the present disclosure is generally indicated by the reference numeral 10 and is particularly shown in FIG. 1 to FIG. 3a of the drawing. The cold space arrangement (10) comprises a chamber (12), a refrigeration unit (28) (see FIG. 4) and a powering system (32) (see FIG. 7).

Figure 4:
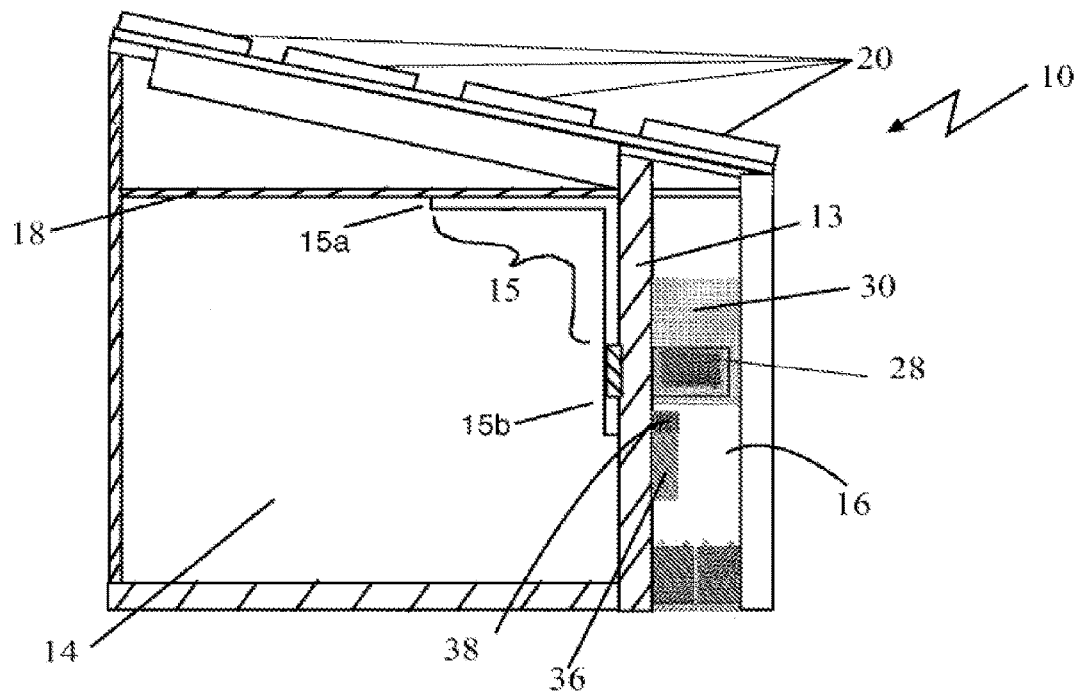
FIG. 4 illustrates a sectional side view of the cold space arrangement with an insulated compartment and a non-insulated compartment in accordance with the present disclosure.

The chamber (12) has an insulated compartment (14) and a non-insulated compartment (16), as shown in FIG. 4, insulatingly separated from each other by an insulating partition wall (13). The insulated walls, ceiling and floor of the chamber (12) may have any suitable R value selected based on achieving the desired design cooling load for the insulated compartment (14) based on ambient environment design criteria. The insulated compartment (14) is located on the operative front side of the chamber (12), as illustrated in FIG. 4, while the non-insulated compartment (16) is located on the rear side of the chamber (12). The chamber (12) is provided with a roof (18) which may form the ceiling for the chamber (12). The roof (18) enables supporting a plurality of solar panels (20) arranged in at least one array. In one embodiment, the plurality of solar panels (20) is arranged on a frame so as to define an inclination angle (θ) with the roof (18) at the end of the non-insulated chamber (16). The solar panels (20) are oriented relative to north and south to maximize the incident solar radiation. The cold storage arrangement (10) may be arranged in any orientation relative to the solar panels (20). For example, the cold storage arrangement (10) may be oriented to minimize the amount of solar energy impinging the walls of the insulated compartment (14) and, overall, impinging any surfaces the cold storage arrangement (10) other than the solar panels (20), so as to minimize the cooling load. In the northern hemisphere, the non-insulated chamber (16) may be oriented to face southward. The inclination angle (θ) is approximately equal to the latitude angle of the location wherein the cold storage arrangement (10) is mounted. The solar panels (20) utilize solar energy for charging a plurality of batteries in a battery bank (34) of the powering system (32) during daylight hours. The batteries are sufficiently charged during the daylight hours so as to operate the cold storage arrangement (10) during night hours. A battery back-up system is provided to run the refrigeration unit (28) over an extended period of time to cater to unavailability of adequate sunlight.

Additionally, alternate provision is provided to operate the refrigeration unit (28) on generator power or electrical energy form the mains supply line.

The insulated compartment (14) provides a storage space for storing of perishable commodities at a predetermined temperature, typically lower than ambient. The perishable commodities are accommodated within the insulated compartment (14) using stacking bins or shelves depending on the necessity of the perishable commodities. The insulated compartment (14) is provided with an insulated door (22), illustrated in FIG. 2, for accessing the insulated compartment (14) and allow easy movement of commodities into and out of the chamber (12). Additionally, a product discharge door (23), illustrated in FIG. 3b, may be installed with the insulated door (22) in order to allow movement of the commodities into and out of the insulated compartment (14). This helps in preserving the cold air within the insulated compartment (14) as the insulated door (22) is not required to be kept open for a longer period of time. Further, the insulated compartment (14) may be provided with an LED lighting arrangement which may be run by the powering system (32), illustrated in FIG. 7.

Non-insulated compartment (16) may be provided, and may house components such as the powering system (32), the refrigeration unit (28) and the air filtration unit (30). In the depicted embodiment, the refrigeration unit (28) houses a condenser (33a), a compressor (33b) and an evaporator (33c), enclosed within a high-density polyethylene shell which provides protection thereto. The structural and functional configuration of the refrigeration unit (28) may be as disclosed in U.S. Pat. No. 5,809,789, the disclosure of which is incorporated herein by reference. In the embodiment depicted, the refrigeration unit (28) is a cabinet (35a) partitioned into a cold cell (35b) and a warm cell (35c) by an insulated wall (35d). The evaporator coil (35e) and the evaporator fan (35f) are situated within the cold cell (35b) and surrounded by the insulated wall (35d) while the compressor (33b), the condenser (33a) and the evaporator fan motor (35g) are situated within the warm cell (35c) which is located outside the insulated wall (35d). The refrigeration unit (28) being a compact self-contained cabinet enables easy installation, replacement and servicing.

The non-insulated compartment (16) provides security and protection against the environment, such as the weather, to the powering system (32), the refrigeration unit (28) and the air filtration unit (30). The solar panels (20) are located on the roof (18) of the chamber (12). The battery bank (34) is positioned within the non-insulated compartment (16) so as to be in close proximity to the solar panels. The proximity of the solar panels (20) to the battery bank (34) minimizes the losses involved in the length of the electrical wiring involved and hence reduces the losses involved in transmitting electrical power from the solar panels (20). The non-insulated compartment (16) is provided with an entry door (26) to allow easy access to the non-insulated compartment (16), thus, facilitating maintenance of the powering system (32), the refrigeration unit (28) and the air filtration unit (30).

The non-insulated compartment (16) includes a pair of spaced apart vents (11) for fluidly communicating atmospheric air into and out of the non-insulated compartment (16). The pair of opposing vents (11) may be positioned on opposite walls of the non-insulated compartment (16) to enable cross flow of the atmospheric air. The air filtration unit (30) is positioned in the path of the atmospheric air coming in through one of the vents (11) to enable filtering the incoming atmospheric air of dust and debris before being admitted into the condenser (33a) of the refrigeration unit (28). Partitions may be included to separate the air inlet side of the condensing coils (35e) from the air outlet side so that only filtered air is drawn into the inlet. This helps in eliminating a potential build-up of dust and debris on the condenser (33a) and thus maintains the heat transfer efficiency of the refrigeration unit (28) for an increased time period and prevents the compressor (33b) from being damaged due to overheating.

The refrigeration unit (28), powered by the powering system (32), receives filtered atmospheric air from the air filtration unit (30) to transfer heat from the condenser (33a) and thereby cooling the refrigerant within the refrigeration unit (28). As is known with a refrigeration cycle, the refrigerant is expanded downstream of the condenser (33a), dropping the temperature of the refrigerant so that the refrigerant can absorb heat from the air flowing across the evaporator coils (35e) as the refrigerant flows therethrough. The air within the insulated compartment (14) is continuously cooled by being circulated, by a fan, across the evaporator coils (35e) of the refrigeration unit (28), hence forming refrigerated dehumidified air. If necessary, any moisture which condenses out of the air on the evaporator coils (35e) or other components of the refrigeration unit (28) may be directed to flow to any suitable location.

Figure 5:
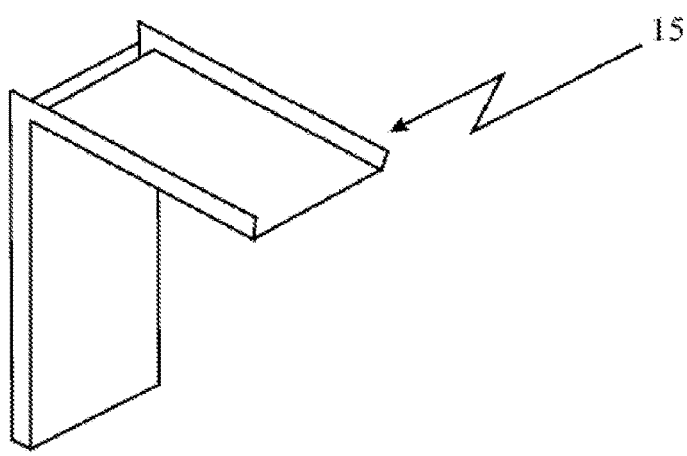
FIG. 5 illustrates an internal venting assembly of the cold space arrangement.

The refrigerated dehumidified air is recirculated through the refrigeration unit (28) so as to maintain the temperature within the insulated compartment (14) at a desired level. The refrigerated dehumidified air flowing from the evaporator coils (35e) of the refrigeration unit (28) is guided to the insulated compartment (14) via a duct (15), illustrated in FIG. 5, thermally conditioning insulated compartment (14) which preserves perishable commodities stored therein. The duct (15) may be of any suitable configuration. In the embodiment depicted, duct (15) includes a cold air discharge portion (15a) and a warm air return portion (15b). The cold air discharge portion (15a) receives the refrigerated dehumidified air from the refrigeration unit (28) downstream of the evaporator coils, and directs the refrigerated dehumidified air upward along the wall and along the ceiling (18), to be dispersed into the insulated compartment (14) from the exit (15a). The refrigerated dehumidified air flows by convection within the insulated compartment (14), thereby maintaining the insulated compartment (14) and any contents at the desired temperature or temperature range. The convective flow path of the refrigerated dehumidified air may flow from the exit (15a) along the ceiling (18), down along the walls, and back to an entrance of the warm air return of the refrigeration unit (28) to be recirculated and cooled across the evaporator coils (35e). The cycle of recirculation is continued until the temperature within the insulated compartment (14) is reduced to the desired level. A temperature controller (24) communicates with the refrigeration unit (28). The temperature controller (24) enables setting the temperature to be maintained within the insulated compartment (14) at the desired level. Further, the temperature controller enables operating the refrigeration unit (28) in a cycle so as to maintain the insulated compartment (14) at the desired level.

The structural and functional configuration of the refrigeration unit (28) enables separation of heated portions and cold portions of the refrigeration unit (28) which capacitates the refrigeration unit (28) to deliver refrigerated cold air into the insulated compartment (14) with increased efficiency. The cold cell (35b) of the refrigeration unit (28) may be positioned within an opening provided on the insulating partition wall (13), and may extend partially into the insulated compartment (14), while the warm cell (35c) of the refrigeration unit (28) may be positioned within the non-insulated compartment (16). The separation of heated portions and cold portions of the refrigeration unit (28) results in reduction of energy consumption by 25% in comparison to traditional refrigeration systems, thus maximizing the use of the solar electric power generated by the solar panels (20). Further, the high-density polyethylene shell and the components of the refrigeration unit (28) housed therein are substantially recyclable, making the refrigeration unit (28) ecofriendly and affordable.

Figure 6:
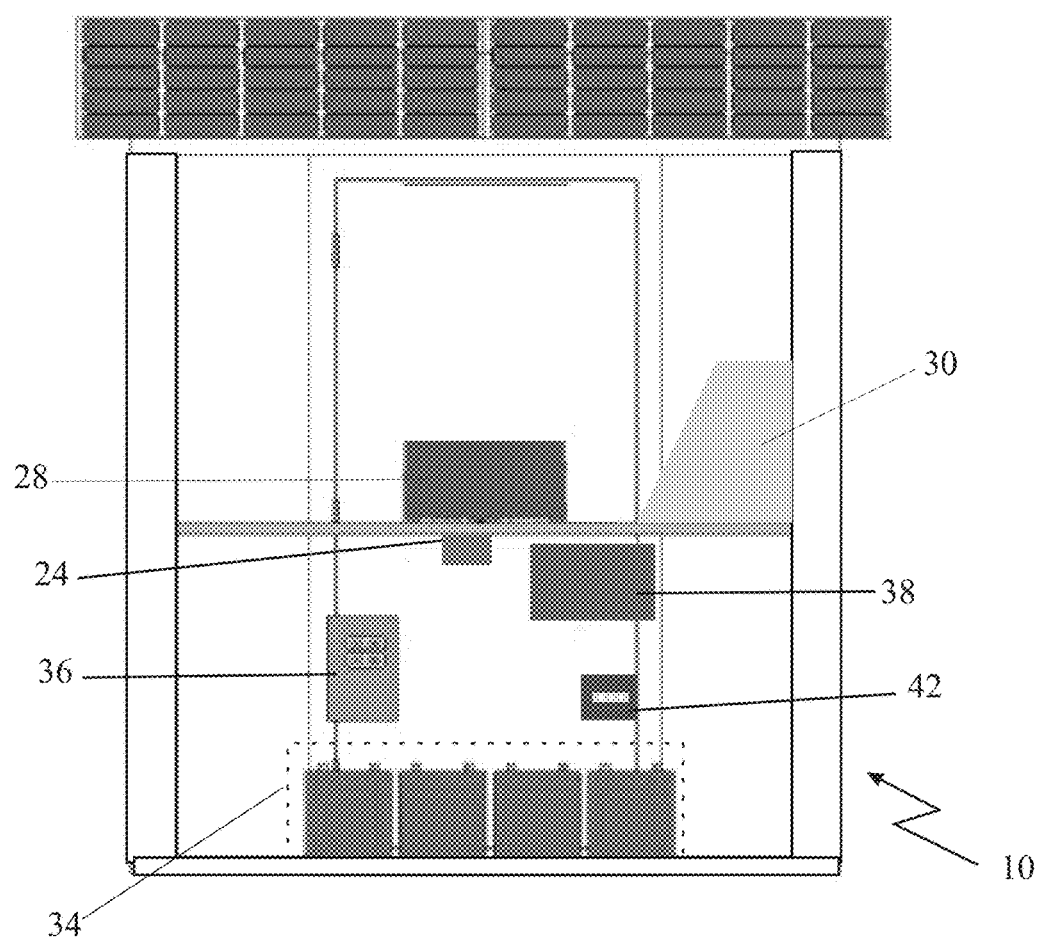
FIG. 6 illustrates the components located within the non-insulated compartment.
Figure 7:
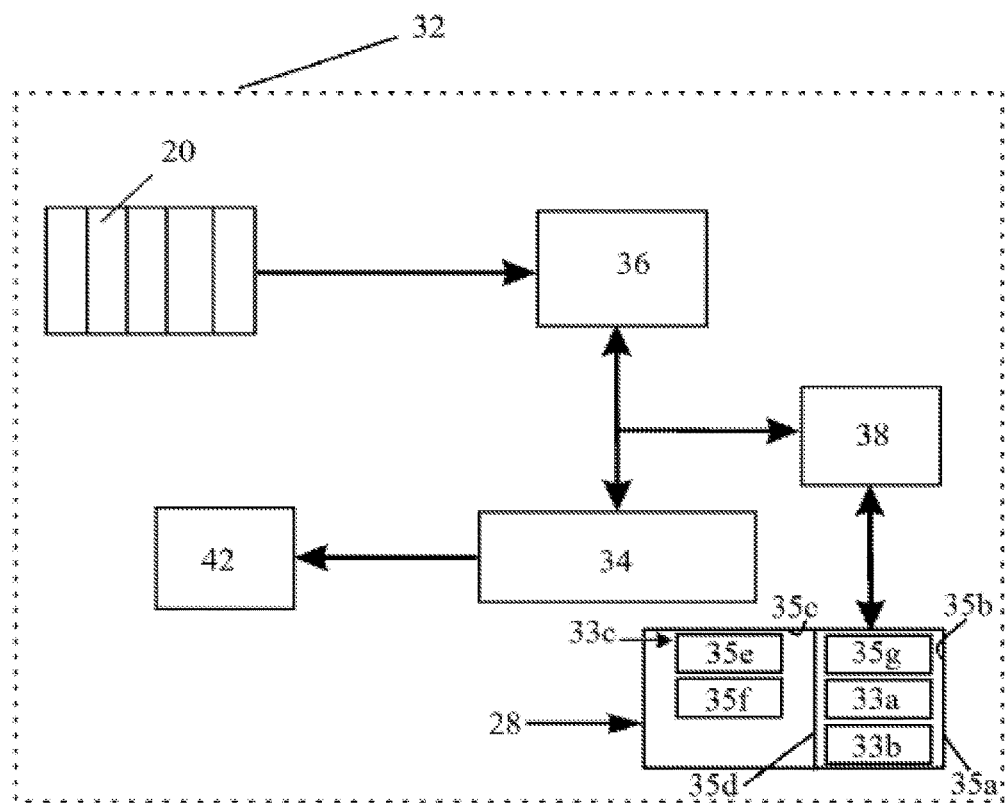
FIG. 7 illustrates the power system of the cold space arrangement in accordance with the present disclosure.

The powering system (32), illustrated in FIG. 7, comprises the plurality of batteries in the battery bank (34), shown in FIG. 6, which are charged by the solar electric power supplied by the solar panels (20). The rate at which the battery bank (34) is charged by the solar panels (20) is regulated by a charge controller (36), which is configured not to overcharge the batteries. Solar panels (20) may be any size, quantity and output number suitably matched with the other components of the cold space arrangement (10). For example, in one embodiment eight UL Solar model STP125P-NS 125 watt panels, each having a maximum power voltage of 18 volts and a maximum power current of 7.11 amp, and a Coleman Air Model CS150-SMA 150 Amp charger were used. In this embodiment, the charger was oversized by a factor of about two in consideration of the output spike that can occur from the solar panels (20) due as a result of the cloud edge effect.

The battery bank (34) supplies the required power for operation of the refrigeration unit (28) through an inverter (38). The output of inverter (38) may be of any surge, continuous power, output voltage and waveform suitable for the refrigeration unit (28). One such inverter suitable for the embodiment depicted is a Samlex America model SAM-2000-12 with 10.5 v to 15 v input, 115 VAC pure sine wave output, 2000 watts continuous and 4000 watts surge. Or a Samlex America PST-200S-12A may be used. Inverter (38) is a pure wave form inverter, also known as a true sine wave, and has low idle current drain of less than 1 amp, providing peak efficiency of 85%.

The electrical capacity and specifications and the configuration of the battery bank (34) may be of any arrangement suitable for the electrical load and cycle times based on the components, efficiency and ambient environment. For example, a plurality of deep cycle batteries may be arranged to provide a 12 volt potential by connecting pairs of 6 volt batteries in series. Alternatively, 12 volt deep cycle batteries may be used. To provide the necessary amperage hour, the 12 volt pairs (or individual 12 volt batteries) may be connected in parallel with each other. In this example, eight 6 volt batteries arranged in four 12 volt pairs are connected in parallel to provide over 1000 amperage hours.

The battery bank (34) provides stability to the cold space arrangement (10), allowing the system to maintain the desired temperature during periods of low or no solar energy, such as during night or in the presence of clouds. Thus, it may be desirable to monitor the battery bank (34) to identify batteries before they fail. The level of charge in each of the batteries and the cumulative level of charge remaining in the battery bank (34) may be indicated on a battery health indicator (42). The battery health monitor (42) may be powered by the inverter (38).

The capacity of the battery bank (34) allows operation of the refrigeration unit (28) for a desired period of time and the combination of the solar panels (20) and the charge controller (36) is configured to provide the desired recharging capacity for the specific operating and ambient environments, based on loads, loss and available energy, including considerations of cooling load of the cold space arrangement (10), efficiency and capacity of the refrigeration unit (28), available sun hours per day, etc. In one embodiment, depending on load, the refrigeration unit (28) may have a 50% duty cycle, running for about 15 minutes and being off for about 15 minutes. During the off period, essentially no energy is being drawn from the battery bank (34) with all of the available energy from the solar panels (20) going to charge the battery bank (34). In the event of a battery failure, in the presence of sufficient solar energy, the solar panels (20) preferably can deliver sufficient power, through the inverter (38), for continued operation of the refrigeration unit (28).

In accordance with an alternative embodiment of the powering system (32), the plurality of batteries in the battery bank (34) may be charged by an alternate, back up source. For example a wind generator or a mains AC supply (not shown). For a mains AC supply, a converter (not shown) is provided to convert the voltage of the power supply from the mains AC supply (not shown) to obtain DC power of suitable voltage for charging the plurality of batteries in the battery bank (34). The converter (not shown) typically includes but is not limited to a rectifier, an AC/DC converter, transformers and SMPS (Switched-mode power supply) systems. In accordance with another aspect of the powering system (32), the mains AC supply (not shown) intermittently supplements the charging power derived from the solar panels (20). The refrigeration unit (28) of the chamber (12) may be powered by the mains AC supply (not shown) in the event that the battery bank (34) fails or is not charged enough to supply adequate power.

TECHNICAL ADVANCEMENTS

The technical advancements offered by the present disclosure include the realization of:
  use of solar power to operate a cold storage arrangement independent of alternate source of power;
  a cold storage arrangement which is easy to install at a wide variety of locations;
  minimal requirement of maintenance;
  enabling storage of commodities over an extended time period;
  a cost effective arrangement of cold storage for use by street vendors and specialty stores requiring storage of commodities at a temperature below ambient temperature; and
  an efficient and reliable arrangement for cold storage.

Economic Significance

The economic significance offered by the present disclosure includes the realization of:
  eliminating usage of electrical energy from the power grid in the presence of solar energy;
  increasing the shelf life of perishable commodities; and
  reducing the economic loss incurred due to decay of the commodities.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

The numerical values given of various physical parameters, dimensions and quantities are only approximate values and it is envisaged that the values higher or lower than the numerical value assigned to the physical parameters, dimensions and quantities fall within the scope of the disclosure unless there is a statement in the specification to the contrary.

Wherever a range of values is specified, a value up to 10% below and above the lowest and highest numerical value respectively, of the specified range, is included in the scope of the disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A cold storage arrangement for preservation of perishable commodities over an extended time period, comprising:
    a chamber covered by a ceiling;
    an insulated partitioning wall adapted to partition said chamber into an insulated compartment and a non-insulated compartment, said insulated partitioning wall extending vertically within said chamber such that said insulated compartment is horizontally opposed from said non-insulated compartment, wherein said insulated compartment includes an insulated door for access within said insulated compartment;
    an inlet vent and an outlet vent positioned on said non-insulated compartment for respective inlet and outlet of atmospheric air;
    a refrigeration unit mounted on said insulated partitioning wall, said refrigeration unit adapted to coolingly circulate refrigerated de-humidified air to said insulated compartment via a duct in fluid communication with said insulated compartment, said insulated compartment adapted to be maintained at a desired temperature;
    an air filtration unit adapted to filter the atmospheric air entering through said inlet vent to form a filtered atmospheric air, said air filtration unit being adapted to direct the filtered atmospheric air to said refrigeration unit and expel the filtered atmospheric air to the environment for withdrawing heat from said refrigeration unit;
    an array of solar panels;
    a battery bank including a plurality of batteries; and
    a powering system housed within said non-insulated compartment including a charge controller, said powering system electrically connected to said refrigeration unit and adapted to receive power from at least said array of solar panels, said powering system further adapted to controllably charge said battery bank, wherein said charge controller is operatively connected to said battery bank and said array of solar panels and configured to direct charge from said array of solar panels to said battery bank to provide a desired recharging capacity, but not overcharge said battery bank, and wherein said charge controller is further configured such that said battery bank powers said refrigeration unit and, in the event of failure of said battery bank, said array of solar panels powers said refrigeration unit for continuous operation of said refrigeration unit,
    wherein said insulated door is configured to cover an opening to said insulated compartment and includes a product discharge door for movement of the commodities into and out of said insulated compartment, wherein said product discharge door is configured to cover a portion of said opening smaller than a remainder of said opening, and wherein said product discharge door is configured to open while said insulated door is not open for allowing movement of commodities therethrough and preserving a cold air within said insulated compartment.

2. A cold storage arrangement for preservation of perishable commodities over an extended time period, comprising:
    a chamber covered by a ceiling;
    an insulated partitioning wall adapted to partition said chamber into an insulated compartment and a non-insulated compartment, said insulated partitioning wall extending vertically within said chamber such that said insulated compartment is horizontally opposed from said non-insulated compartment, wherein said insulated compartment includes an insulated door for access within said insulated compartment;
    an inlet vent and an outlet vent positioned on said non-insulated compartment for respective inlet and outlet of atmospheric air;
    a refrigeration unit mounted on said insulated partitioning wall, said refrigeration unit adapted to coolingly circulate refrigerated de-humidified air to said insulated compartment via a duct in fluid communication with said insulated compartment, said insulated compartment adapted to be maintained at a desired temperature;
    an air filtration unit adapted to filter the atmospheric air entering through said inlet vent to form a filtered atmospheric air, said air filtration unit being adapted to direct the filtered atmospheric air to said refrigeration unit and expel the filtered atmospheric air to the environment for withdrawing heat from said refrigeration unit;
    an array of solar panels;
    a battery bank including a plurality of batteries; and
    a powering system housed within said non-insulated compartment including a charge controller, said powering system electrically connected to said refrigeration unit and adapted to receive power from at least said array of solar panels, said powering system further adapted to controllably charge said battery bank, wherein said charge controller is operatively connected to said battery bank and said array of solar panels and configured to direct charge from said array of solar panels to said battery bank to provide a desired recharging capacity, but not overcharge said battery bank, and wherein said charge controller is further configured such that said battery bank powers said refrigeration unit and, in the event of failure of said battery bank, said array of solar panels powers said refrigeration unit for continuous operation of said refrigeration unit,
    wherein said refrigeration unit further includes an air inlet and an air outlet, and wherein said non-insulated compartment includes a partition configured to fluidly separate said air inlet and said air outlet such that only filtered atmospheric air is drawn into said air inlet of said refrigeration unit.

3. The cold storage arrangement of claim 2, wherein said non-insulated compartment includes an access door for repair and maintenance.

4. The cold storage arrangement of claim 2, wherein said refrigeration unit includes a condenser, a compressor and an evaporator enclosed with a cabinet, said cabinet being made of a high density polymer shell.

5. The cold storage arrangement of claim 2, wherein said battery bank is further adapted to be charged by a mains AC supply through a convertor, said battery bank being adapted to receive at least a continuous power supply and an intermittent power supply from the mains AC supply.

6. The cold storage arrangement of claim 5, wherein said convertor is selected from the group consisting of a rectifier, an AC/DC converter, a transformer and switched-mode power supply.

7. The cold storage arrangement of claim 2, wherein said insulated door is configured to cover an opening to said insulated compartment and includes a product discharge door for movement of the commodities into and out of said insulated compartment, wherein said product discharge door is configured to cover a portion of said opening smaller than a remainder of said opening, and wherein said product discharge door is configured to open while said insulated door is not open for allowing movement of commodities therethrough and preserving a cold air within said insulated compartment.

8. The cold storage arrangement of claim 3, wherein said access door of said non-insulated compartment is positioned horizontally opposite from said insulated door of said insulated compartment.

9. The cold storage arrangement of claim 2, wherein said duct includes a cold air discharge portion and a warm air return portion, wherein said cold air discharge portion is positioned downstream of said refrigeration unit and adapted to discharge the refrigerated de-humidified air into said insulated compartment from said refrigeration unit, and wherein said warm air return portion is fluidly connected to said refrigeration unit and configured to receive the refrigerated de-humidified air from said insulated compartment for recirculation to said refrigeration unit.

10. The cold storage arrangement of claim 9, wherein said cold air discharge portion is positioned vertically higher than said warm air return portion and adapted to direct the refrigerated de-humidified air down within said insulated compartment toward said warm air return portion for recirculation.

11. The cold storage arrangement of claim 10, wherein said cold air discharge portion is positioned adjacent to said ceiling within said insulated compartment and configured to further direct the refrigerated de-humidified air along said ceiling.

12. The cold storage arrangement of claim 2, wherein said ceiling supports said array of solar panels thereon.

13. The cold storage arrangement of claim 12, wherein said array of solar panels and said ceiling are arranged relative to each other to define an inclination angle therebetween for orienting said array of solar panels toward a solar radiation.

14. The cold storage arrangement of claim 13, further comprising a panel frame, wherein said array of solar panels are arranged on said panel frame at said inclination angle, and wherein said panel frame is configured to arrange said array of solar panels at said inclination angle such that said inclination angle is approximately equal to a latitude angle of the environment.

15. The cold storage arrangement of claim 2, wherein said refrigeration unit includes a cabinet having an insulated wall, wherein said cabinet within said chamber extends from said non-insulated compartment to said insulated compartment and said insulated wall partitions said refrigeration unit into a warm cell within said cabinet and a cold cell within said cabinet such that said insulated wall surrounds said cold cell, wherein said warm cell of said refrigeration unit is positioned within said non-insulated compartment.

16. The cold storage arrangement of claim 15, wherein said refrigeration unit includes an evaporator coil, an evaporation fan, a compressor, a condenser, and an evaporation fan motor, wherein said evaporator coil and said evaporation fan are situated within said cold cell of said cabinet, wherein said compressor, said condenser, and said evaporation fan motor are situated within said warm cell of said cabinet, and wherein said cabinet is configured to be installed, replaced, or serviced as a self-contained cabinet with said evaporator coil, said evaporation fan, said compressor, said condenser, and said evaporation fan motor contained therein.

17. A cold storage arrangement for preservation of perishable commodities over an extended time period, comprising:
  a chamber covered by a ceiling;
  an insulated partitioning wall adapted to partition said chamber into an insulated compartment and a non-insulated compartment, said insulated partitioning wall extending vertically within said chamber such that said insulated compartment is horizontally opposed from said non-insulated compartment, wherein said insulated compartment includes an insulated door for access within said insulated compartment;
  an inlet vent and an outlet vent positioned on said non-insulated compartment for respective inlet and outlet of atmospheric air;
  a refrigeration unit mounted on said insulated partitioning wall, said refrigeration unit adapted to coolingly circulate refrigerated de-humidified air to said insulated compartment via a duct in fluid communication with said insulated compartment, said insulated compartment adapted to be maintained at a desired temperature;
  an air filtration unit adapted to filter the atmospheric air entering through said inlet vent to form a filtered atmospheric air, said air filtration unit being adapted to direct the filtered atmospheric air to said refrigeration unit and expel the filtered atmospheric air to the environment for withdrawing heat from said refrigeration unit;
  an array of solar panels;
  a battery bank including a plurality of batteries; and
  a powering system housed within said non-insulated compartment including a charge controller, said powering system electrically connected to said refrigeration unit and adapted to receive power from at least said array of solar panels, said powering system further adapted to controllably charge said battery bank, wherein said charge controller is operatively connected to said battery bank and said array of solar panels and configured to direct charge from said array of solar panels to said battery bank to provide a desired recharging capacity, but not overcharge said battery bank, and wherein said charge controller is further configured such that said battery bank powers said refrigeration unit and, in the event of failure of said battery bank, said array of solar panels powers said refrigeration unit for continuous operation of said refrigeration unit, wherein said non-insulated compartment includes a first compartment wall and a second compartment wall, wherein said first compartment wall is positioned horizontally opposite from said second compartment wall, wherein said inlet vent extends through said first compartment wall, and wherein said outlet vent extends through said second compartment wall for cross flow of the atmospheric air through said non-insulated compartment.

18. The cold storage arrangement of claim 7, wherein said insulated door has a lower edge, and wherein said lower edge is at least partially defined by said product discharge door such that a remainder of said product discharge door with said insulated door is positioned vertically above said lower edge.

19. The cold storage arrangement of claim 2, wherein said non-insulated compartment includes a first compartment wall and a second compartment wall, wherein said first compartment wall is positioned horizontally opposite from said second compartment wall, wherein said inlet vent extends through said first compartment wall, and wherein said outlet vent extends through said second compartment wall for cross flow of the atmospheric air through said non-insulated compartment.

* * * * *